United States Patent
Trojan-Heitele et al.

(10) Patent No.: US 10,899,645 B2
(45) Date of Patent: Jan. 26, 2021

(54) WATER CONDITIONER FOR PREVENTING OR REDUCING MINERAL PRECIPITATION

(75) Inventors: Birgit Trojan-Heitele, Marbach (CH); Roland Scholz, Balgach (CH); Bernd Heitele, Marbach (CH)

(73) Assignee: AQUIS WASSER-LUFT-SYSTEME GMBH, Lindau, Zweigniederlassung Rebstein, Rebstein (CH)

( * ) Notice: Subject to any disclaimer, the term of this patent is extended or adjusted under 35 U.S.C. 154(b) by 176 days.

(21) Appl. No.: 14/002,985

(22) PCT Filed: Feb. 24, 2012

(86) PCT No.: PCT/EP2012/000796
§ 371 (c)(1),
(2), (4) Date: Sep. 3, 2013

(87) PCT Pub. No.: WO2012/119710
PCT Pub. Date: Sep. 13, 2012

(65) Prior Publication Data
US 2013/0334119 A1    Dec. 19, 2013

(30) Foreign Application Priority Data
Mar. 4, 2011 (DE) .......................... 10 2011 013 114

(51) Int. Cl.
*C02F 1/00* (2006.01)
*C02F 1/42* (2006.01)
(Continued)

(52) U.S. Cl.
CPC ................ *C02F 5/08* (2013.01); *C02F 1/003* (2013.01); *C02F 1/687* (2013.01); *C02F 5/086* (2013.01);
(Continued)

(58) Field of Classification Search
CPC .......... C02F 2001/422; C02F 2001/425; C02F 5/08; C02F 5/083; C02F 5/086;
(Continued)

(56) References Cited

U.S. PATENT DOCUMENTS 3,189,554 A    6/1965  Dean
3,855,125 A   12/1974  Lin
(Continued)

FOREIGN PATENT DOCUMENTS

DE    100 10 759 A1    9/2001
EP    0 451 434 A1    10/1991
(Continued)

OTHER PUBLICATIONS

Machine Translation of JP 2006263718 to Kitagawa et al. (2006) (obtained from Google Patents Nov. 2018) (Year: 2006).*
(Continued)

*Primary Examiner* — Lucas A Stelling
(74) *Attorney, Agent, or Firm* — Breneman & Georges

(57) ABSTRACT

The present invention relates to a water treatment apparatus (1), in particular for supplying water-conducting and/or water-heating household appliances or appliances for producing and preparing food and/or beverages using treated drinking water, e.g. automatic drinks machines, automatic coffee machines, ice machines, cooking and baking appliances, steam generators or high-pressure cleaners, air conditioners or the like using treated water, comprising an agent (3) present in solid form for reducing mineral precipitates. It is characterized in that a first medium which influences the dissolution behavior of the agent for reducing mineral precipitates is provided.

25 Claims, 8 Drawing Sheets

Figure 1:
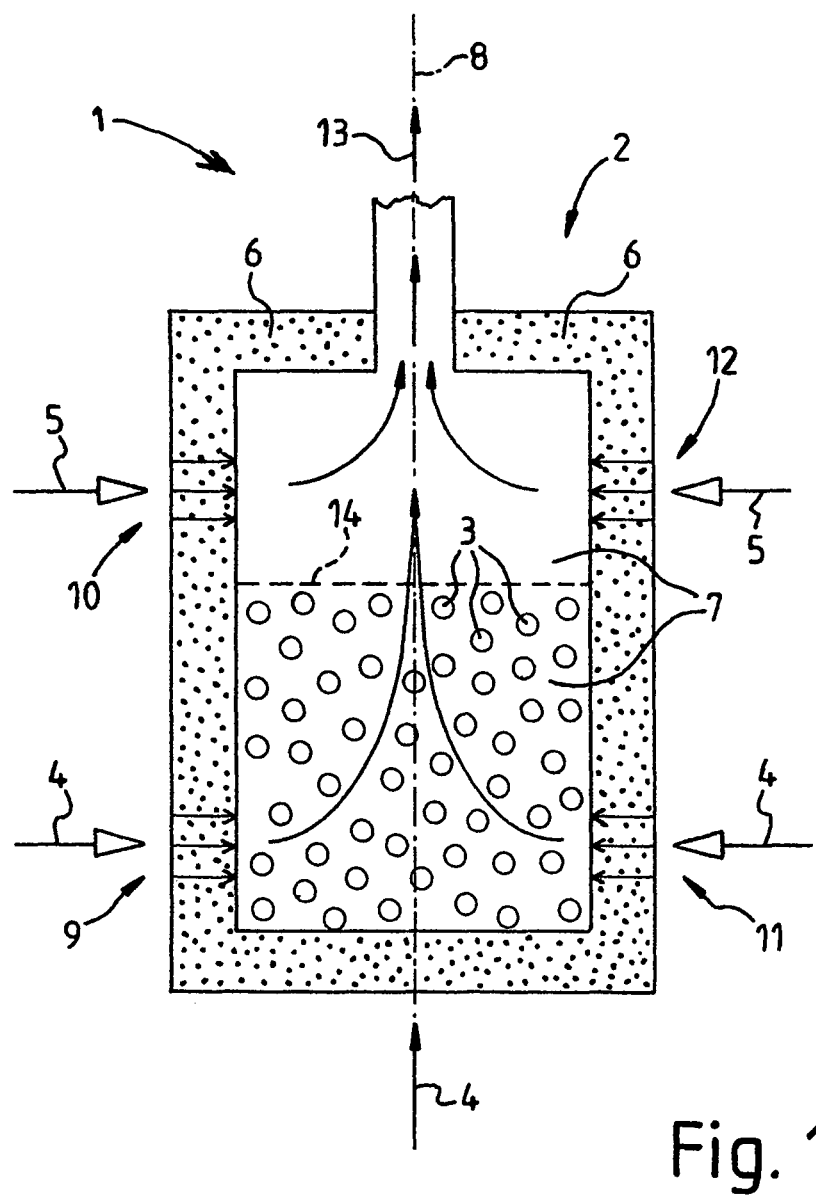

(51) Int. Cl.
*C02F 1/66* (2006.01)
*C02F 1/68* (2006.01)
*C02F 5/08* (2006.01)
*C02F 9/00* (2006.01)

(52) U.S. Cl.
CPC ............ *C02F 9/005* (2013.01); *C02F 1/66* (2013.01); *C02F 2001/422* (2013.01); *C02F 2001/425* (2013.01); *C02F 2303/22* (2013.01); *C02F 2307/10* (2013.01); *C02F 2307/12* (2013.01)

(58) Field of Classification Search
CPC .. C02F 1/003; C02F 1/66; C02F 9/005; C02F 2303/22; C02F 2307/04; C02F 2307/10; C02F 2307/12; C02F 1/68; C02F 1/685; C02F 1/687; C02F 1/688
See application file for complete search history.

(56) References Cited

U.S. PATENT DOCUMENTS

| | | |
|---|---|---|
| 4,269,723 A | 5/1981 | Barford et al. |
| 4,547,294 A | 10/1985 | Goeldner |
| 4,861,511 A | 8/1989 | Kaplan |
| 5,328,633 A | 7/1994 | Hasting et al. |
| 7,413,649 B2 * | 8/2008 | Bittner .................... C02F 1/004 210/108 |
| 2003/0158073 A1 | 8/2003 | Norwood et al. |
| 2006/0096925 A1 * | 5/2006 | Roffman ................... B01J 20/20 210/660 |
| 2008/0245994 A1 | 10/2008 | Casonati |
| 2009/0048144 A1 | 2/2009 | Corradini et al. |
| 2010/0263688 A1 | 10/2010 | Monsrud et al. |
| 2010/0326898 A1 * | 12/2010 | Scholz ..................... C02F 1/42 210/232 |

FOREIGN PATENT DOCUMENTS

| | | | |
|---|---|---|---|
| EP | 0 831 065 A1 | | 3/1998 |
| EP | 2 272 801 A2 | | 1/2011 |
| JP | 2006263718 A | * | 10/2006 |
| WO | WO 2012/119710 A1 | | 9/2012 |

OTHER PUBLICATIONS

Danish Environmental Protection Agency, "Environmental and Health Assessment of Substances in Household Detergents and Cosmetic Detergent Products," (2001), Section 7. (Year: 2001).*

Omega.com "Technical: pH Reference: Introduction to pH" (date not given). (Year: 2018).*

* cited by examiner

WATER CONDITIONER FOR PREVENTING OR REDUCING MINERAL PRECIPITATION

CROSS REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

REFERENCE TO A "MICROFICHE APPENDIX"

Not Applicable.

BACKGROUND OF THE INVENTION

Field of the Invention and Description of Related Art

Mineral precipitates, in particular the formation of $CaCO_3$ precipitates (lime), cause problems in the operation of appliances which, for example, involve hot water or in which water constituents are concentrated. These include, for example, water boilers, coffee machines, steamers, dishwashers, washing machines, steam appliances, in particular steam irons, high-pressure cleaners, air purifiers and conditioners, ice machines, in particular ice cube machines, drinking water dispensers, automatic drinks machines or the like. To avoid or reduce troublesome mineral precipitates, in particular lime precipitates, raw water pretreatment is therefore used according to the commercial prior art. Such pretreatment involves softening or carbonate removal units in which ion exchangers and in particular cation exchangers, e.g. weakly acidic cation exchangers, are used. The addition of an agent for preventing crystal formation, for example $CaCO_3$ crystal formation, or for stabilizing minerals dissolved in the water is also a customary method of suppressing mineral precipitates, in particular lime precipitates. EP 2 272 801 A2 also describes the combination of softening or carbonate removal with agents for reducing mineral precipitates, for example agents for preventing crystal formation, or anti-scaling substances, for example complexing agents such as polyphosphates.

Known methods of introducing agents for reducing mineral precipitates, or anti-scaling substances such as complexing agents in liquids, in particular phosphates or polyphosphates, are, inter alia, liquid metering devices and systems for dissolving crystalline or amorphous or solid anti-scaling substances, e.g. complexing agents such as polyphosphate salts, in the form of small spheres, powders or otherwise conditioned use forms.

The introduction of anti-scaling substances such as complexing agents, in particular polyphosphates, to suppress crystallization of supersaturated calcium carbonate solutions are nowadays recommended in many countries only by means of liquid metering devices which add a polyphosphate concentrate in an amount proportional to the flow-through volume, since the known systems provided with solid complexing agents, hereinafter referred to as solids feeder system, do not make uniform introduction of polyphosphate into the water possible because of a different residence and contact time between complexing agent and liquid which depends on the respective use, in particular of polyphosphate salts and water. As a result of this nonuniform introduction, the concentration of dissolved polyphosphate in the water fluctuates greatly depending on the requirements of the user or consumer.

To avoid excessive concentrations of the anti-scaling substance or of the complexing agent in liquids, sparingly soluble anti-scaling substances or complexing agents, for example sparingly soluble polyphosphates, are therefore used, particularly in the conditioning of drinking water.

Thus, one is in a dilemma with regard the use of sparingly soluble anti-scaling substances, e.g. polyphosphates, in solids feeder systems. If the recommended maximum concentration of anti-scaling substance, for example of polyphosphate, in the treated water (7 mg/l for polyphosphate in accordance with TVO Deutschland) is not to be exceeded after stagnation of the system, e.g. overnight, only extremely sparingly soluble polyphosphates can be used. On the other hand, if water flows at a high flow rate through the solids feeder system when a continuous supply of treated water is required, the introduced amount of polyphosphate very quickly goes below the desired minimum concentration required for a recommended solubility stabilization of the minerals, in particular of the $CaCO_3$. Thus, the water treatment loses its effectiveness for protection against lime precipitates or for the effective reduction of $CaCO_3$ precipitates.

BRIEF SUMMARY OF THE INVENTION

The present patent application addresses the problem of improving the treatment of water, in particular of drinking water, according to the prior art outlined in the introductory part.

The solution is achieved proceeding from the preamble of claim 1 by its characterizing features. The dependent claims indicate useful and advantageous embodiments.

The present invention accordingly provides a water treatment apparatus, in particular for supplying water-conducting and/or water-heating household appliances, kitchen appliances or appliances for producing and preparing food and/or beverages using treated drinking water, e.g. automatic drinks machines, automatic coffee machines, ice machines, cooking and baking appliances, steam generators or high-pressure cleaners, air conditioners or the like using treated water, comprising an agent for reducing mineral precipitates. It is characterized in that a first medium which influences the dissolution behavior of the agent for reducing mineral precipitates is provided.

The influencing medium can be, for example, a solubility inhibitor, solubility enhancer, solubility accelerator, solubility moderator or concentration moderator for the means for reducing mineral precipitates. For the purposes of the invention, a moderator is a medium which, depending on the influencing of the agent by a first medium and/or by constituents of the water and/or by the ambient temperature and/or depending on the mode of operation of the water treatment apparatus, reduces or increases the solubility of the agent or the concentration of the agent in the water and/or maintains the solubility or concentration of the agent in a particular range.

The moderator can, for example, withdraw ions from the agent or donate them to the agent or exchange ions with the agent or reduce or increase the solubility of the agent or take up or release agent dissolved in the water. Thus, during a stagnation phase or when flow does not occur through the water treatment apparatus, the concentration of the agent in the water can be kept within a prescribed range and/or the agent can be kept in a low-solubility state, for example by uptake of the agent from the water, e.g. by absorption or exchange of ions of the agent. In a subsequent offtake phase or when flow occurs through the water treatment apparatus, the moderator can release or exchange the agent previously taken up by it and/or the ions of the agent previously taken up by it again and thus keep the concentration of the agent in the water in a prescribed range and/or increase the solubility of the agent again.

Thus, the shorter contact time of the agent with the medium in offtake phases or phases when flow occurs through the water treatment apparatus does not lead to a deficient concentration of the agent in the water and to reduced or absent effectiveness of the agent in protecting against mineral precipitates. In stagnation phases, or when flow does not occur through the water treatment apparatus, the longer contact time of the agent with the medium does not lead to an excessive concentration of the agent in the water.

The influencing medium can be present in solid, liquid or gaseous form. It can be mobile or immobile in the water treatment apparatus.

The structure of such a water treatment apparatus is based on the recognition that a satisfactory reduction in mineral precipitates by means of an influence on the dissolution behavior of the agent for reducing mineral precipitates, in particular its dissolution behavior in the water to be treated thereby, can also be achieved using agents by means of which this has hitherto been impossible or not possible to a satisfactory extent, in particular not under all operating conditions.

Thus, for example, the solubility of an intrinsically sparingly soluble agent for reducing mineral precipitates or for reducing hardness precipitates, for example of $CaCO_3$, can be influenced in a targeted way so that the solubility of the agent during times when water is taken off or when flow occurs through the water treatment apparatus is increased and the agent dissolves in a sufficient concentration in the water an the precipitation of $CaCO_3$ in piping and/or in regions in which the treated water is heated or concentrated is prevented or at least significantly reduced.

In another embodiment, it is possible, for example, to influence the solubility of an intrinsically readily soluble agent for reducing mineral precipitates or for reducing hardness precipitates, for example of $CaCO_3$, in a targeted manner so that the solubility of the agent decreases, for example during times of stagnation of water or when flow does not occur through the water treatment apparatus, in order to avoid an excessive concentration of the agent in the water.

The dissolution behavior of the agent for reducing mineral precipitates can additionally be countered by provision of a second medium which influences the dissolution behavior of the agent for reducing mineral precipitates.

For example, in the case of a dissolution behavior which has not yet been significantly increased by the first medium, a modification, for example in the form of an additional increase in the solubility of the agent for reducing mineral precipitates, can be effected by the second medium, for example during times when water is taken off or when flow occurs through the water treatment apparatus. Here, a gradated influence, for example, on the dissolution behavior of the agent for reducing mineral precipitates is also conceivable.

In a further preferred embodiment, the second medium can counter the increase in the dissolution behavior of the agent for reducing mineral precipitates brought about by the first medium. For example, an undesirable, excessive concentration of the agent provided for reducing mineral precipitates in the water could be countered during times of stagnation of water or when flow does not occur through the water treatment apparatus.

This can, in a preferred way, be effected by a second medium which, for example, has a moderating effect on the solubility of the agent or on the concentration of the agent in the water. This moderator could, for example, act so that it reduces the solubility of the agent for reducing mineral precipitates during stagnation phases or when flow does not occur through the water treatment apparatus and/or scavenge an increased concentration of the agent in the water and release it again and/or increase the solubility of the agent again during the next offtake phase or phase of flow through the water treatment apparatus.

The agent for reducing mineral precipitates could, for example, be embedded in a medium, for example in a solid medium and/or in an immobilized medium, which preferably acts as moderator.

Experiments have shown anion exchangers to be advantageous as moderator. Embedding in an anion exchanger makes it possible to moderate the solubility and/or the amount of the agent released into the water and/or the concentration of the agent in the water. Suitable anion exchangers are strongly basic, weakly basic or intermediate-basicity variants. Furthermore, the second medium can comprise a pH increaser. Media which have been found to be useful for this purpose are, for example, sparingly soluble calcium carbonate and/or magnesium carbonate, e.g. in the form of a granular material (Magnodol® etc.). This granular material dissolves and has an alkaline reaction. This agent can thus increase the pH in stagnation phases. The increase in pH reduces the solubility of the agent for reducing mineral precipitates.

Since $Ca^{2+}$ and $Mg^{2+}$ ions are liberated in the process of dissolution of the pH increaser, the solubility of the agent for reducing mineral precipitates can additionally be reduced when it preferably comprises sparingly soluble $Ca^{2+}$, $Mg^{2+}$ salts, e.g. comprises $Ca^{2+}$, $Mg^{2+}$ polyphosphate.

In accordance with the rules of solubility of salts in water, a high concentration of $Ca^{2+}$ and $Mg^{2+}$ in contact with the agent reduces the solubility of the anion of the agent (solubility product).

It is particularly advantageous for the second medium for embedding the agent for reducing mineral precipitates to consist of a mixture of pH increaser and moderator in order to influence the solubility of the agent and/or the concentration of the agent for reducing mineral precipitates in the water. This is particularly advantageous during stagnation phases or phases during which flow does not occur through the water treatment apparatus and/or when the solubility of an agent for reducing mineral precipitates is influenced by means of a first medium.

It would also be possible to use an agent for reducing mineral precipitates which itself acts as a second medium, e.g. as pH increaser.

It would also be possible to use a gaseous medium or a medium acting in gaseous form, for example to influence the pH in the water, e.g. by formation of carbonic acid by dissolution of $CO_2$ in the water. For example, it would also be possible to interrupt or significantly reduce the contact between the first medium and the agent for reducing mineral precipitates, for example by liberation of $CO_2$ gas or by means of gases of any type, e.g. air, in order to avoid an excessive concentration of the agent in the water used, especially during stagnation phases or when flow does not occur through the water treatment apparatus.

In the case of liquid media and/or media which have mobile behavior in the water treatment apparatus, a mixing space for the first medium and the second medium can preferably be provided, e.g. in order to mix these in such a way that an influence on the dissolution behavior of the agent for reducing mineral precipitates can be exerted in a manner matched to the respective operating state of the water treatment apparatus and very precisely and very quickly.

The mixing space or a flow path for the first medium and/or the second medium is particularly preferably configured so that the mixing ratio of these is variable. For example, during offtake operation or when flow occurs through the water treatment apparatus, the mixing of the two media can be poor so that the first medium can act virtually unhindered on the dissolution behavior of the agent for reducing mineral precipitates, for example can increase the solubility of the agent and thus the concentration of agent in the water and thus optimally protect the water treatment apparatus against mineral precipitates. In stagnation operation or when flow does not occur through the water treatment apparatus, on the other hand, strong mixing of the first medium with the second medium can be effected so that the action of the first medium on the dissolution behavior of the agent for reducing mineral precipitates is prevented in this way, for example the solubility of the agent and thus the concentration of agent for reducing mineral precipitates in the surrounding water is reduced, in particular even reduced substantially and further dissolution is even largely prevented.

This can, for example, be realized by the first medium having a pH which increases the solubility of the agent for reducing mineral precipitates and the second medium having a pH which counters this positive influence on the solubility, i.e. reduces the dissolution behavior again.

In a preferred embodiment, the first medium has acidifying behavior and the second medium has a property which counters this acidifying effect. The first medium can, for example, be a first substream of the water to be treated which has been filtered via a water treatment section, for example via a carbonate removal section. Here, the substream can be acidified. The second medium can, on the other hand, be a second substream of the water to be treated which is conveyed differently from the first substream. This second substream can, for example, also be conveyed via a water treatment section, in particular a filter section, for example in order to meet further treatment requirements for the water concerned. Examples are particle filtration, heavy metal filtration, etc.

The pH of the first medium is preferably approximately in the range below 6, in particular in the range of about 3 or from 3 to 4.5 during offtake operation or while flow occurs through the water treatment apparatus.

To be able to add the two media in an appropriate way to the agent provided for reducing mineral precipitates, an appropriate receptacle can be provided for this agent. The abovementioned mixing space could, for example, be realized by appropriately configured conduits for input and discharge of the water to be treated and in particular of the first and/or second medium in the interior thereof.

The receptacle for the agent for reducing mineral precipitates preferably has at least one first inflow path for the first medium and at least one second inflow path for the second medium. The inflow path for the second medium is advantageously closer, in the flow direction, to an outflow path from the receptacle than the inflow path for the first medium. In this way, the second medium does not come into contact or comes into contact only slightly or only briefly with the agent for reducing mineral precipitates during offtake operation or when flow occurs through the water treatment apparatus. In comparison, the first medium which is provided for influencing the dissolution behavior of the agent for reducing mineral precipitates comes into contact strongly and/or for longer with the agent and can thus increase the solubility of the agent and thus the concentration of the agent for reducing mineral precipitates in the water.

The receptacle for the agent for reducing mineral precipitates can preferably have a porous dividing wall. In particular, this can also be configured as a porous-walled body, for example in the form of a body, e.g. a sheath, consisting of carbon. When activated carbon is used, a corresponding filter section can be realized at the same time. The porous passages in the carbon for the supply of the medium can be utilized for inflow of the two substreams of the water to be treated, which represent the first medium and the second medium. In one embodiment, an end-face inflow of the first medium into the water treatment apparatus can be realized in the region remote from the outflow and a region either in the end face region close to the outflow region of a sheath and/or in the wall region close to this can serve for inflow of the second medium. In a variant of this embodiment, the first medium and the second medium can flow all around the receptacle, with very widely separated feed lines for the first medium and the second medium being provided in this case.

The setting of the pH of the first medium can, for example, be carried out by the use of ion exchangers. The ion exchangers can, for example, be cation exchangers, in particular weakly acidic cation exchangers, present predominantly in the hydrogen form. These alter the pH in the first medium or in the substream of the water to be treated which flows through the cation exchanger section concerned. During an offtake operation, i.e. during the time in which the substream flows through the cation exchanger, the said substream is appropriately acidified and supplied to the agent for reducing mineral precipitates. This increases the solubility of the agent for reducing mineral precipitates and thus the concentration of the agent in water in such a way that the entire water flowing through the water treatment apparatus is treated sufficiently to prevent, or at least greatly reduce, mineral precipitates.

The agent for reducing mineral precipitates can, in a preferred embodiment, be a complexing agent, for example a phosphate-containing and/or polyphosphate-containing complexing agent. Possible states here are crystalline, amorphous and/or others.

As agent for reducing mineral precipitates, preference is given to an agent for preventing crystal formation, for example a complexing agent, for example polyphosphate, which is sparingly soluble at a neutral pH. In this way, a reduction or stabilization of the dissolution behavior of the agent can be brought about comparatively quickly by mixing in of water which has not been acidified in the case of stagnation or when flow does not occur through the water treatment apparatus and an excessive concentration of the agent in the water can be prevented. For the purposes of the invention, a complexing agent is an agent which binds minerals, in particular metals such as calcium, magnesium, barium, etc., and hinders reaction thereof with other reactants and crystal formation thereof or precipitation in an aqueous solution. In particular for hindering the precipitation of sparingly soluble alkaline earth metal compounds (e.g. hardness) or for inhibiting corrosion, complexing agents such as phosphonates, phosphoric acid, triphosphates or polyphosphates are used since they keep sparingly soluble compounds in solution or convert them into readily soluble compounds.

The receptacle for the agent for reducing mineral precipitates is preferably arranged in a water treatment apparatus in such a way that its outer lateral surface, preferably also a surface of an end face, is in contact with the first medium and/or second medium or with a medium mixture formed therefrom. For this purpose, the receptacle can be, for example, in the form of an element configured as an exchangeable cartridge, in particular as a filter element, or be arranged in such an element, preferably at the end or in a filter section provided for acidification of the substream of the water to be treated forming the first medium.

A second substream, for example, a substream forming the second medium, can, for example, be conducted so that it is conveyed, for example, as bypass stream around the acidification section of the filter element. According to the above explanation, the introduction of this substream of the water to be treated is effected in the vicinity of the region of the receptacle for the agent for reducing mineral precipitates at which the water to be treated is discharged from this receptacle.

To be able to install the water treatment apparatus in a piping system, the latter can advantageously further comprise a conduit connection head. Such conduit connection heads normally encompass a feed line connection, a discharge line connection and usually a connection or seat for an exchangeable element to be hydrodynamically arranged between these two connections, in particular a filter element, e.g. an exchangeable filter cartridge. This is usually configured so that water to be treated flows via the feed line into the conduit connection and further into the filter element, passes through the latter so as to treat the water and is subsequently conveyed via the discharge line on the conduit connection head back into the piping system equipped therewith. Appliances connected downstream can in this way be reliably protected against mineral precipitates. Examples are household appliances or appliances for the production and treatment of foods and/or beverages, e.g. water boilers, coffee machines, steamers, dishwashers, washing machines, steam appliances, in particular steam irons, high-pressure cleaners, air purifiers and conditioners, ice machines, in particular ice cube machines, drinking water dispensers, automatic drinks machines or the like.

In another embodiment, the water treatment apparatus could comprise a water tank, in particular with a filter connection element, e.g. in the form of a water filter jug, or as unit of a drinks machine, in particular a hot drinks machine, e.g. a coffee machine. In this way, appliances which are not connected to a piping system can also be supplied with appropriately treated water.

In a further variant, the water treatment apparatus could also have a connection element provided directly for connection to an appliance. Here, a correspondingly provided appliance could be protected against deposits due to mineral precipitates either by means of a conduit or a water tank with intermediate installation of a water treatment apparatus according to the invention.

BRIEF DESCRIPTION OF THE SEVERAL VIEWS OF THE DRAWING(S)

The accompanying figures show, purely by way of example and schematically, possible working examples. The figures show FIG. 1 a vessel charged with an agent for reducing mineral precipitates, FIG. 2 a water filter element equipped with a vessel as per FIG. 1, FIG. 3 a water treatment apparatus having a conduit connection head, FIG. 4 a water treatment apparatus having a water tank, FIG. 5 a water treatment apparatus having a connection element for connection to an appliance, FIG. 6 a water filter element equipped with an agent for reducing mineral precipitates embedded in a solid or immobilized medium, FIG. 7 a water treatment apparatus in a water filter jug, FIG. 8 a vessel which is charged with an agent for reducing mineral precipitates and has very widely spaced feed lines for the media and has flow all around, FIG. 9a a water treatment apparatus having a water tank when flow is occurring through the apparatus, and FIG. 9b a water treatment apparatus having a water tank when flow is not occurring through the apparatus.

DETAILED DESCRIPTION OF THE INVENTION INCLUDING BEST MODE

Figure 2:
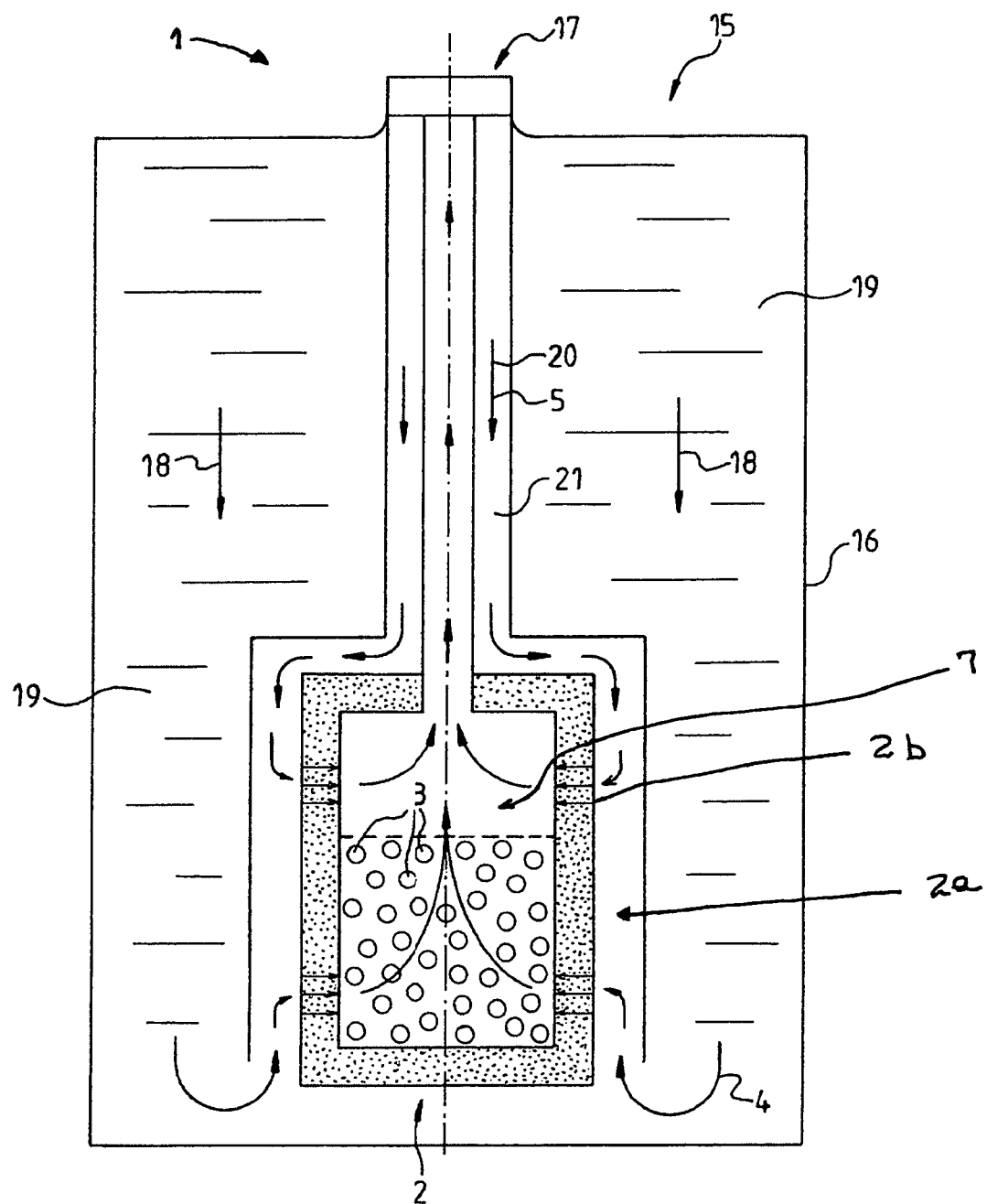

Accordingly, FIGS. 1 and 2 show, as part of a water treatment apparatus 1, a second receptacle 2 disposed in a second chamber or compartment 2a. The second receptacle 2 has a porous wall 2b and contains an agent 3 for reducing mineral precipitates. Arrows symbolically show flow paths for a first medium 4 which influences the dissolution behavior of the agent for reducing mineral precipitates and for a second medium 5 which likewise influences the dissolution behavior of the agent for reducing mineral precipitates. The receptacle 2 which is formed by a preferably porous wall 6 forms a mixing space 7 for the first medium and second medium 4, 5 in its interior.

Dots symbolizing a porous material forming the receptacle 2 are shown by way of example to the left of the symbolically depicted axis 8. Depending on the configuration and arrangement of feed lines for the first medium and the second medium 4, 5, the latter can flow in over the total length of the wall 6 into the interior of the receptacle 2. Arrows 9, 10 once again symbolically show a preferred region for passage of the medium 4, 5 concerned through the wall 6. This can either be formed by a feed section opening into this region and/or optionally also be brought about by appropriate measures, e.g. targeted matching of the flow behavior of the two media or by an increased permeability of the wall 6 in these regions compared to the other wall regions and/or end faces.

As an alternative to a porous embodiment of a wall 6, such a wall can also be made impermeable and have correspondingly prepared permeable regions in appropriate regions, as shown symbolically by way of example on the right-hand side by the arrows 11, 12. This makes targeted flow of the two media 4, 5 possible. In offtake operation, i.e. when comparatively good flow occurs, it can in this way be ensured that essentially only the first medium 4 flows around the agent 3 for reducing mineral precipitates and the second medium 5 is supplied essentially directly and without effect on the agent 3 to the discharge stream of the treated water.

A retention means 14, e.g. in the form of a sieve, a mesh, a woven fabric or another liquid-permeable material, can additionally assist the separation of the two media streams 4, 5 by retaining the agent 3 in the section of the mixing space 7 remote from the outlet.

FIG. 2 shows a filter element 15 having a first chamber or first compartment or first receptacle or housing 16, a connection element 17 and the second receptacle 2 disposed in the second chamber or compartment 2a as per the depiction in FIG. 1. A first substream 18 of the water to be treated by the water treatment apparatus 1 flows via a treatment section 19 and forms the first medium 4 at the outlet thereof. The treatment section 19 can, for example, have a pH reducer, e.g. a cation exchanger, in particular an acidic cation exchanger, for example a weakly acidic cation exchanger, e.g. in the form of a resin. After flowing through the treatment section 19, this first substream forms the first medium 4. A second substream conveyed separately from the first substream, e.g. as bypass 21 to the treatment section 19, forms the second medium 5.

Figure 3:
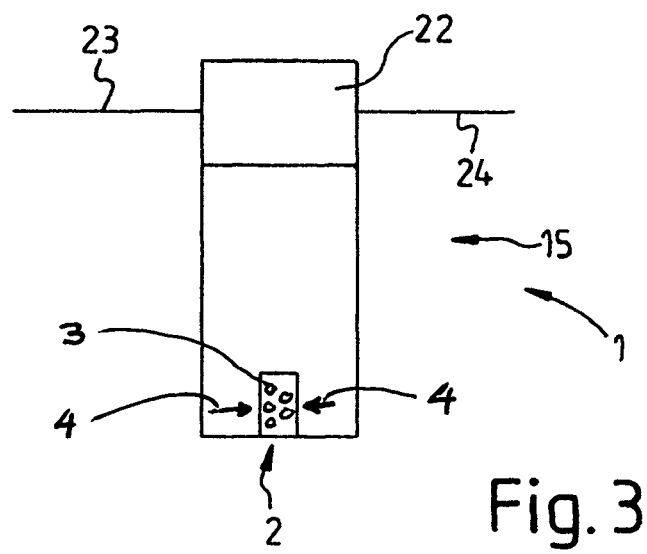

FIG. 3 shows, by way of example and schematically, a water treatment apparatus 1 having a conduit connection head 22, a feed line 23, a discharge line 24 and a filter element 15 connected thereto with at least one first medium 4 and an agent for reducing mineral precipitates 3 arranged therein.

Figure 4:
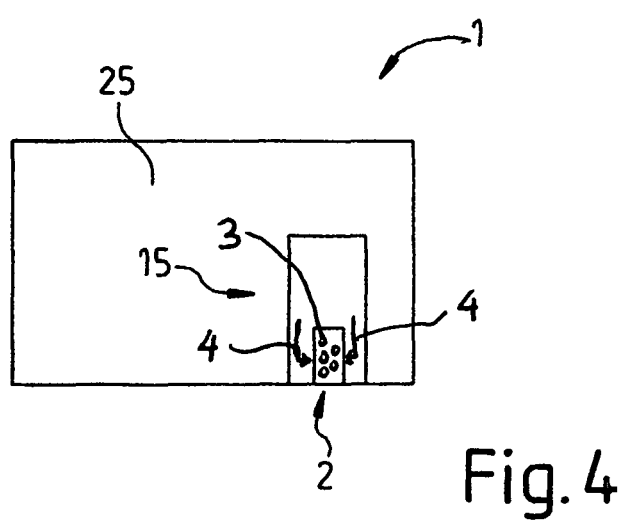

FIG. 4 shows a water treatment apparatus 1 comprising a water tank 25 and once again a filter element 15 with at least a first medium 4 and an agent for reducing mineral precipitates 3.

Figure 5:
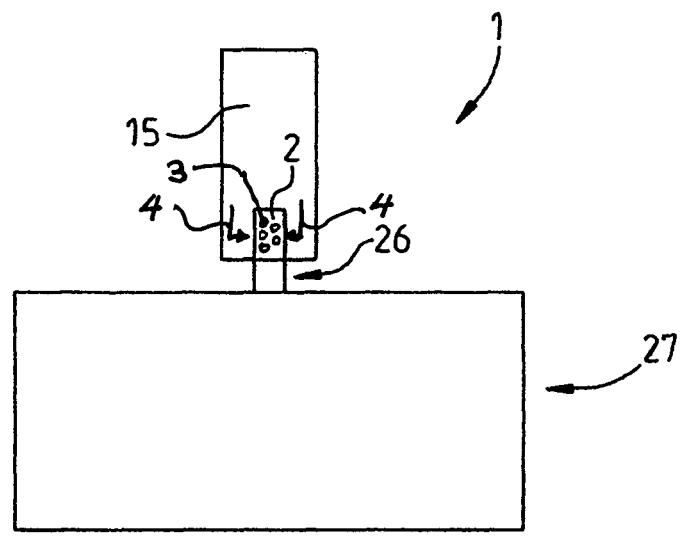

FIG. 5 shows a further embodiment of a water treatment apparatus 1, comprising a filter element 15 with at least one first medium 4 and an agent for reducing mineral precipitates 3 and a connection element 26 for connection to an appliance 27 to be supplied by the apparatus 1.

Figure 6:
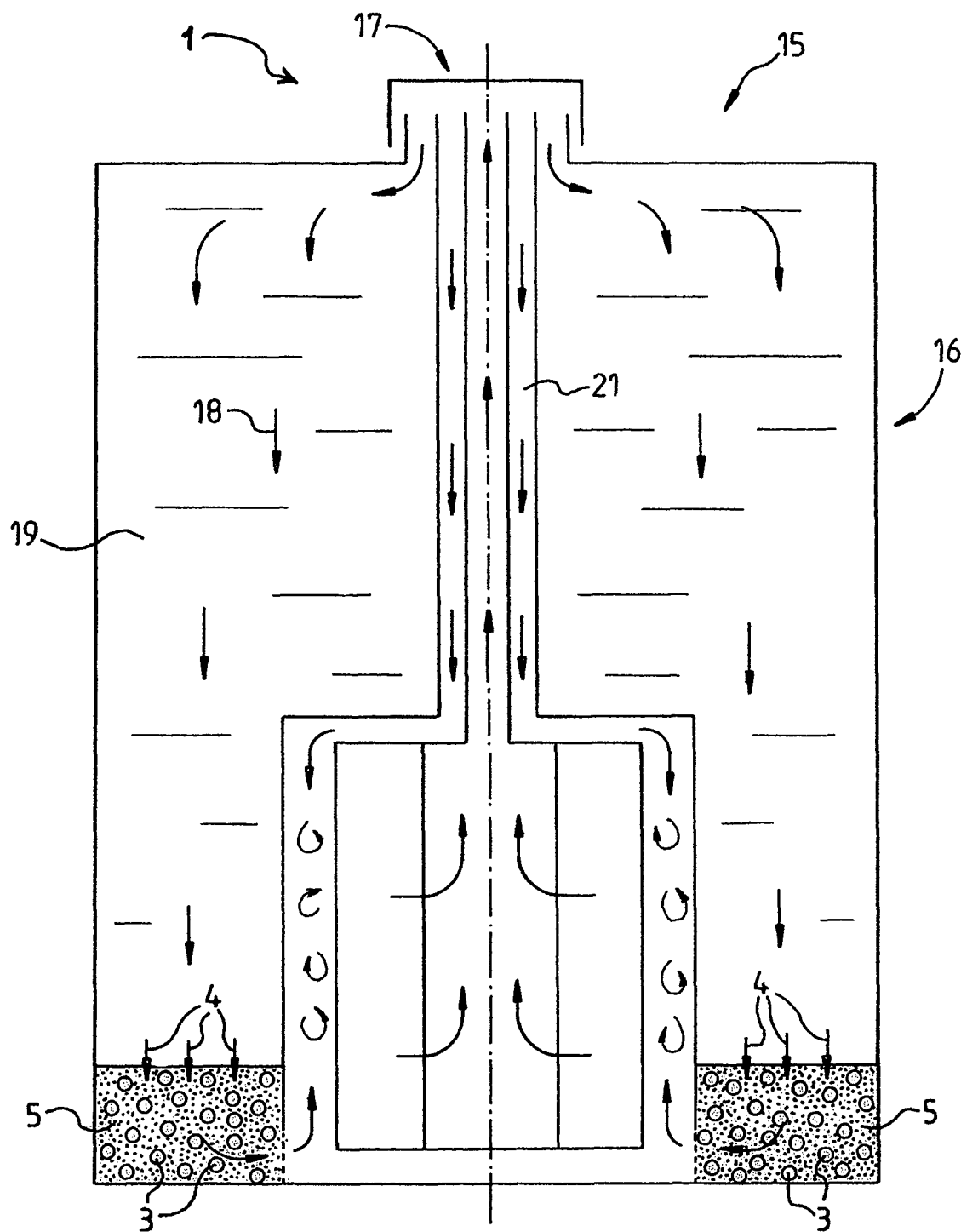

FIG. 6 shows a filter element 15 having a housing 16, a connection element 17 and a second medium which is arranged in a fixed and/or immobilized fashion and in which an agent for reducing mineral precipitates 3 is embedded. It is also possible for the agent 3 to be arranged upstream and/or downstream of the second medium 5. A first substream 18 of the water to be treated by the water treatment apparatus 1 flows via a treatment section 19 and forms the first medium 4 at the outlet thereof. The treatment section 19 can have an acidic or weakly acidic cation exchanger, e.g. in the form of a resin. The medium 4 then flows via the agent for reducing mineral precipitates 3 and the second medium 5 surrounding it. The second medium 5 can be, for example, a medium having a basic reaction, for example a basic or weakly basic anion exchanger and/or a pH increaser, for example sparingly soluble calcium carbonate and/or magnesium carbonate and/or another medium which inhibits the dissolution, moderates the dissolution or moderates the concentration in water of the agent for reducing mineral precipitates. A second substream which is conveyed separately from the first substream, e.g. as bypass 21 to the treatment section 19, mixes with the first substream downstream of the agent for reducing mineral precipitates.

As a further variant, the mixing of the two substreams can also be provided in the region of the agent for reducing mineral precipitates 3 in order to exert a further influence on the solubility behavior of the agent 3 in combination with the second medium 5.

In a further embodiment, the water to be treated can be introduced into the water treatment apparatus 1 entirely via a treatment section 19 at the outlet of which the first medium 4 is formed and this then flows through the agent for reducing mineral precipitates 3 or, in a further variant, through the agent 3 in combination with a second medium 5.

Figure 7:
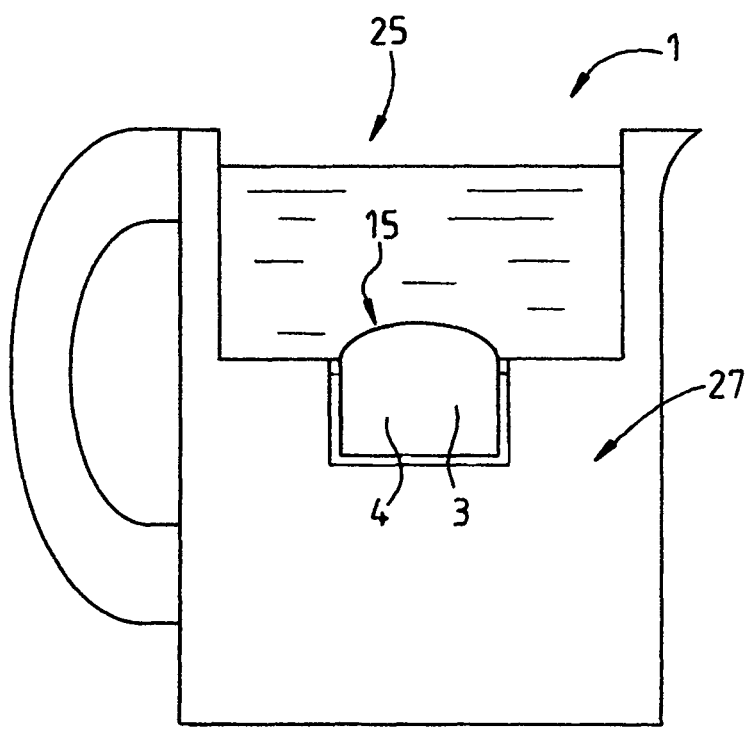

FIG. 7 shows a water treatment apparatus 1 comprising a water tank 25, a filter element 15 and a filtrate storage tank 27. The filter element 15 comprises at least one first medium 4 and an agent for reducing mineral precipitates 3.

Figure 8:
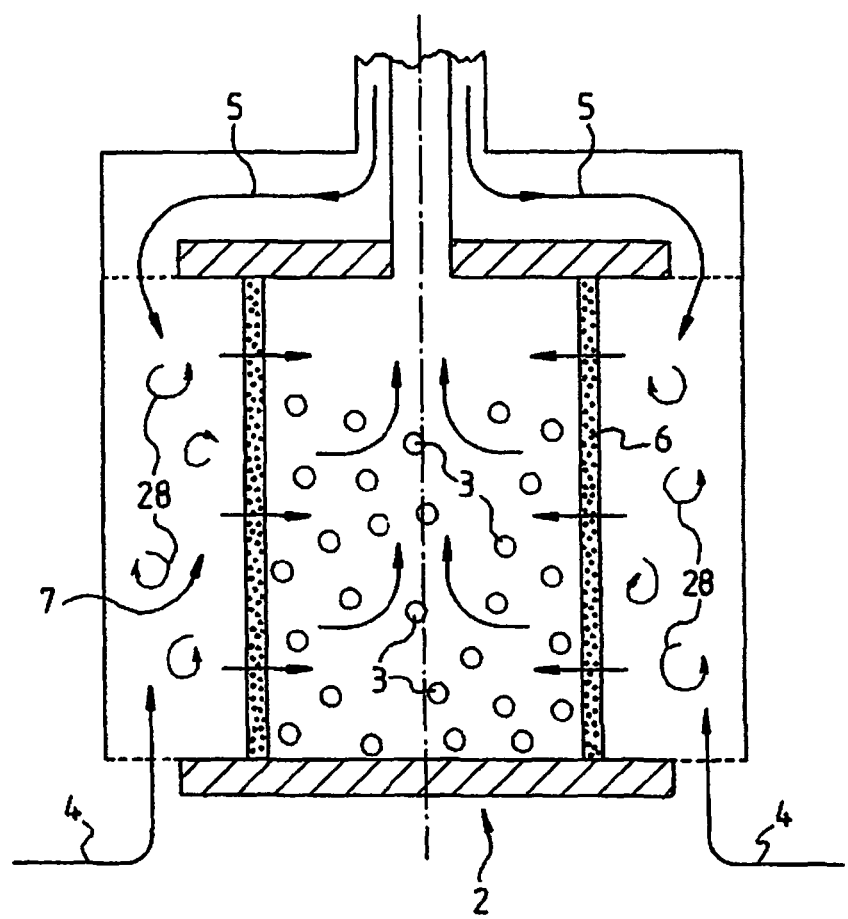

FIG. 8, as part of a water treatment apparatus 1, shows a receptacle 2 for an agent 3 for reducing mineral precipitates. Flow paths for a first medium 4 which influences the dissolution behavior of the agent for reducing mineral precipitates and for a second medium 5 which likewise influences the dissolution behavior of the agent for reducing mineral precipitates are depicted symbolically by arrows 4. The space surrounding the receptacle 2 forms the mixing space 7 for the first and second media 4 and 5. The mixing of the two media 4 and 5 is depicted symbolically by arrows 28.

Figure 9A:
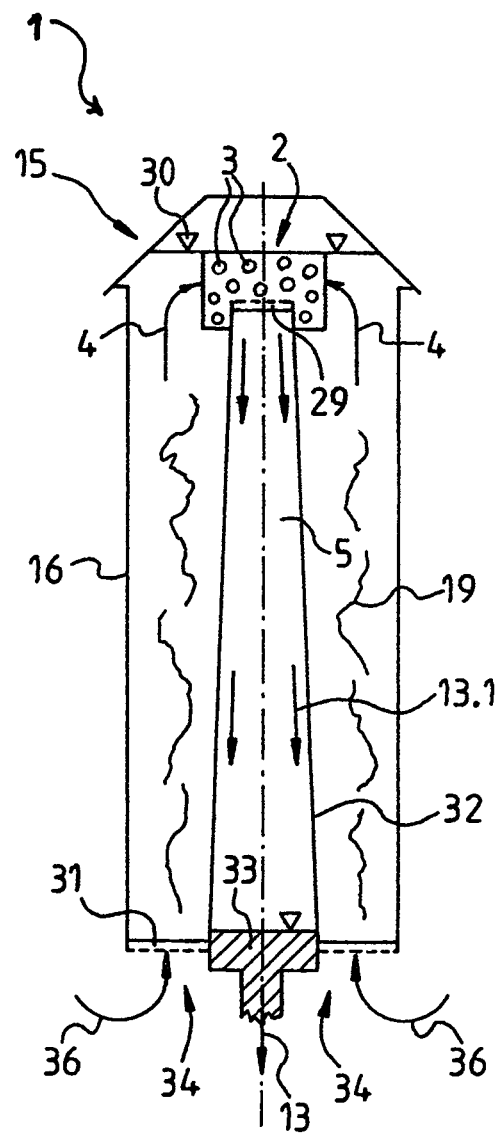
Figure 9:
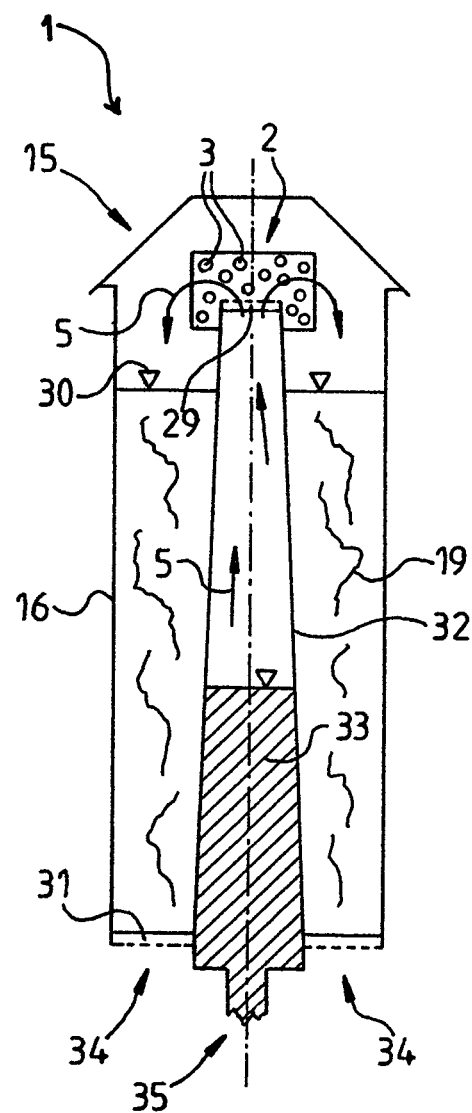

FIGS. 9a and 9b show, purely by way of example and schematically, a filter element 15 of a water treatment apparatus consisting, for example, of the filter element 15 and a water tank or an appliance, shown in section in two different operating states. FIG. 9a shows a depiction in the operating state and FIG. 9b shows a depiction in the stagnation state.

In both depictions, the filter element 15 comprises a housing 16, a conduit 32, for example in the form of a tube, arranged in the interior of the housing, an inlet opening 34 and an outlet opening 35. The inlet opening 34 is located between housing 16 and the wall of the conduit 32 and can comprise a retention means 31, for example in the form of a sieve. The outlet opening 35 is formed in the end region of the conduit 32. It can either directly be the end region thereof or else can be configured in the form of a change in the cross section, for example a reduction in the cross section. A connection piece for connection of the filter element 15, for example to a tank, can advantageously also be provided at this end region of the conduit.

A retention means 31 for filter material arranged in the intermediate space between housing 16 and conduit 32 can be provided in the inlet region of the filter element 15, i.e. the opening 34. At the end of the conduit 32 opposite the outlet, in the interior of the housing 16, there is a receptacle 2 containing agent 3 for reducing mineral precipitates. This receptacle 2 can, for example, have a depression into which the conduit 32 can be plugged, or conversely by means of which the receptacle 2 can be placed on or pushed onto the conduit 32. A further retention means 29 can optionally be provided between the receptacle 2 and the conduit 32 in order to prevent, for example, passage of particles or the receptacle itself can act as retention means for particles.

The inflow 36 of the water to be treated by the filter element is depicted symbolically by two arrows in the inlet region in FIG. 9a. The incoming water flows in the flow direction through the treatment section 19 and forms, by contact with the latter, the first medium 4. The treatment section can have, for example, a pH reducer, e.g. a cation exchanger, in particular a weakly acidic cation exchanger, e.g. in the form of a resin. The first medium 4 flows onward in the flow direction and penetrates into the receptacle 2 and can then act on the medium 3 for reducing mineral precipitates which is arranged therein in such a way that the water flowing through is treated in the desired way and optimally protects against mineral precipitates. It subsequently goes into the interior of the receptacle in the direction of the conduit 32 and flows along the interior wall thereof, for example as peripheral flow in the form of a water film, to the outlet opening 35.

In the operational depiction as per FIG. 9a, a comparatively small amount of filtrate 33 is shown in the outlet region of the conduit 32. This is due to the outflow in the direction of the appliance using the water due to offtake of water. Suction pumps are usually used for offtake of the treated water, i.e. the filtrate. Such pumps generate a reduced pressure in the piping system during operation and this can in turn draw along further water to be treated, for example from a tank in which the filter element 15 is located. The level of the water present in the filter cartridge rises during operation to such an extent that flow through the filter element occurs. A level 30 which is located in the region of the upper edge of the receptacle 2 is drawn in by way of example in FIG. 9a.

The second medium 5, which can be, for example, air or a $CO_2$ gas mixture, is located in the interior of the conduit 32. During the operational state as shown in FIG. 9a, this second medium is drawn in the direction of the outlet by outflow of the filtrate 33 banked up therein due to the volume change in the interior of the conduit 32. In the stagnation state or in phases in which flow does not occur through the apparatus, as shown in FIG. 9b, the filtrate 33 again collects in the outlet region of the conduit 32 because it has not been taken off and thus reduces the volume available for the second medium and thus pushes this in a direction opposite the operational flow direction of the filter element in the direction of the receptacle 2 and through this in the direction of the treatment section 19 which is present between the outer wall of the conduit 32 and the housing 16.

An illustrated depiction of a level 30, in the case of flow equilibrium upstream and downstream of the receptacle 2, is drawn in by way of example below the upper edge of the receptacle 2 in FIG. 9b. In this case, the agent 3 for reducing mineral precipitates is supplied with the second medium and is correspondingly influenced by the latter. In this embodiment, in which air or a $CO_2$ gas mixture is provided as second medium, the contact of the agent 3 with the first medium 4 is interrupted or reduced. As a consequence, the second medium 5 acts, for example, on the solubility behavior of the agent 3 and/or on the concentration of the agent in the water as a result of a corresponding reduction of the moisture content in the receptacle 2 and/or by reduction or hindering of the contact between the agent and the first medium 4. As a result, an excessive concentration of the agent in the treated water during stagnation phases or phases in which flow does not occur through the filter element is prevented. The agent 3 can then briefly dissolve again in a sufficient concentration in the water when water is next taken off or when flow occurs through the filter element due to the previous conversion of the stream of the water to be treated into a first medium 4 (for example by acidification).

When during the subsequent operational phase water to be treated again flows in the operational flow direction through the filter element and the level 30 thus rises again until the water flowing through the filter material forms the first medium 4 and this again penetrates into the receptacle 2 and thus comes into contact with the agent 3 for reducing mineral precipitates, the agent 3 can again be influenced so that the water to be treated can leave the receptacle 2 in the desired quality and can accordingly be available for offtake at the outlet 35.

Further information on possible embodiments is given below.

Particularly sparingly soluble polyphosphate salts display a solubility which has a pronounced dependence on the pH of the liquid surrounding them. The following table shows, by way of example, the dissolution behavior of sparingly soluble polyphosphate salts overnight in water at different pH values of the water.

| pH | Concentration of polyphosphate |
|---|---|
| 4.0 | 60 mg/l |
| 5.0 | 10 mg/l |
| 6.0 | 4 mg/l |
| 7.0 | 2 mg/l |

This property is utilized for increasing the amount of dissolved complexing agents, e.g. polyphosphate, in a water stream flowing continuously or semi-continuously through an apparatus containing sparingly soluble complexing agents, e.g. sparingly soluble polyphosphate salts, by carrying out targeted prior acidification of the stream of water. The prior acidification spontaneously increases the solubility of the sparingly soluble complexing agent or of the sparingly soluble polyphosphate salt.

In a particular embodiment, the stream of water is divided into at least two substreams of which at least one substream is acidified before being passed through an apparatus containing a sparingly soluble complexing agent, e.g. sparingly soluble polyphosphate salts. This substream, which preferably makes up from 5 to 50% of the total volume flow, is, after flowing through the apparatus, recombined with the other substreams. This enables a targeted influence to be exerted on the concentration of dissolved complexing agent, for example polyphosphate, even during continuous throughput in order to achieve effective protection or effective reduction of mineral precipitates, e.g. of calcium carbonate.

In a further preferred embodiment, the apparatus is configured so that when the continuous or semicontinuous volume flow is interrupted, the acidified water in contact with the complexing agent is neutralized, for example by the unacidified water combining with the acidified water, e.g. by means of diffusion, and neutralizing it in such a way that the pH of the mixture rises again and is preferably in the range from pH 5.5 and pH 7. As a result of this type of automatic control, the release of excessive amounts of complexing agents, for example of polyphosphate, and exceeding of maximum permissible values is avoided even during prolonged stagnation times, e.g. overnight or during weekends.

In a further preferred embodiment, the provision of acidified raw water can be effected by filtration of a substream through a weakly acidic cation exchanger which is predominantly in the hydrogen form. Owing to the chemistry of this exchanger, this water has a pH of 3.3-4.5 within the flow range specified for the use, virtually independently of the throughput. The acidified substream is introduced from one side, e.g. radially, through the porous wall of a perforated sheath which is completely or only partially filled with the polyphosphate (e.g. a carbon block filter). At the same time, raw water or unacidified water is introduced from the opposite side. As a result of the simultaneous introduction of the two volume streams in continuous operation, barely any mixing of the raw water, or of the unacidified water, with acidified water takes place in the entry zone of the acidified water and thus in the region of the polyphosphate bed, so that the water coming into contact with the polyphosphate bed has a sufficiently reduced pH for bringing about a targeted increase in the solubility of the polyphosphate during the contact time available. When the acidified water enriched with polyphosphate is drained from the sheath, the acidified water enriched with polyphosphate mixes with the unacidified water in the sheath and forms a mixed water having the desired polyphosphate concentration. As a result, satisfactory concentrations of dissolved polyphosphate in the mixed water are achieved in continuous operation of the apparatus even when using sparingly soluble polyphosphate.

LIST OF REFERENCE NUMERALS

1 Water treatment apparatus
2 Second receptacle
2a Second chamber or second compartment
2b Porous wall
3 Agent for reducing mineral precipitates
4 First medium
5 Second medium
6 Wall
7 Mixing space
8 Axis
9 Arrow
10 Arrow
11 Arrow
12 Arrow
13 Outlet stream
14 Retention means
15 Filter element
16 Housing or first chamber or first compartment or first receptacle
17 Connection element
18 Substream
19 Treatment section
20 Substream
21 Bypass
22 Conduit connection head
23 Feed line
24 Discharge line
25 Water tank
26 Connection element
27 Filtrate storage tank
28 Arrow
29 Retention means
30 Level
31 Retention means
32 Conduit
33 Filtrate
34 Inlet opening
35 Outlet opening
36 Inflow

The invention claimed is:

1. In a water treatment apparatus having a water inlet, water outlet and a phosphate or a polyphosphate complexing agent for reducing mineral precipitates in a solid form wherein the improvement comprises a housing having a first chamber to contain a first liquid medium selected from a group consisting of an acidic aqueous liquid or water treated by cation exchanger to increase solubility of the phosphate or the polyphosphate complexing agent and a second chamber disposed in the housing and connected to the first chamber said second chamber containing the phosphate or the polyphosphate complexing agent and a constantly open bypass connected at one end to the water inlet and another end connected to the second chamber to provide a second liquid medium selected from a group consisting of a liquid less acidic than the first liquid medium or is water from the water inlet to change the dissolution behavior of the phosphate or the polyphosphate complexing agent by changing pH of the environment of the phosphate or the polyphosphate complexing agent in a direction to decrease the solubility, or concentration of the phosphate or the polyphosphate complexing agent and wherein the second chamber is also connected to the water outlet.

2. The water treatment apparatus as claimed in claim 1 further comprising a mixing space to mix the first liquid medium and the second liquid medium disposed between the inlet and the outlet.

3. The water treatment apparatus as claimed in claim 1 wherein a pH of the first liquid medium increases the solubility of the phosphate or the polyphosphate complexing agent.

4. The water treatment apparatus as claimed in claim 3 wherein the first chamber has the cation exchanger to change the pH of the first liquid medium.

5. The water treatment apparatus as claimed in claim 1 wherein a pH of the second liquid medium reduces the solubility of the phosphate or the polyphosphate complexing agent compared to the first liquid medium.

6. The water treatment apparatus as claimed in claim 1 wherein a first substream of the water to be treated is conducted via a water treatment section in the first chamber to provide the first liquid medium and wherein a second substream of the water to be treated is conducted through the constantly open bypass to the second chamber to provide the second liquid medium and thus the second substream is treated differently from the first substream.

7. The water treatment apparatus as claimed in claim 1 wherein the agent for reducing mineral precipitates is a polyphosphate.

8. The water treatment apparatus as claimed in claim 1 further comprising a receptacle with a porous wall in the second chamber containing the phosphate or the polyphosphate complexing agent.

9. The water treatment apparatus as claimed in claim 8 wherein the receptacle for the phosphate or the polyphosphate complexing agent is arranged relative to a filter element in such a way that at least the outer lateral surface of the receptacle is in contact with the second liquid medium.

10. The water treatment apparatus as claimed in claim 1 wherein the second liquid medium is a pH increaser.

11. The water treatment apparatus as claimed in claim 1 wherein the housing further comprises a conduit connection head and an exchangeable filter cartridge.

12. The water treatment apparatus as claimed in claim 1 further comprising a water tank.

13. The water treatment apparatus of claim 1 wherein the second liquid medium decreases the solubility of the agent for reducing mineral precipitates.

14. An improved water filter apparatus having a water impervious outside wall, a water inlet and a water outlet comprising:
  (a) a first compartment or receptacle to form a liquid reservoir to contain a pH decreaser to provide a first liquid medium selected from the group consisting of an acidic aqueous liquid or water treated by a cation exchanger;
  (b) a second compartment or receptacle downstream from the first compartment or receptacle and containing a solid chemical phosphate or polyphosphate complexing agent to reduce mineral precipitates;

(c) a second liquid medium selected from a group consisting of a solubility reducer, a solubility moderator, a concentration moderator, a pH moderator or water;

(d) a constantly open bypass conduit connecting the second compartment or receptacle with the water inlet or the second liquid medium that is less acidic than the first liquid medium to reduce or maintain the solubility or concentration of the solid chemical phosphate or the polyphosphate complexing agent from dissolving; and (e) an outlet to the second compartment or receptacle communicating with the water outlet.

15. The improved water filter apparatus as claimed in claim 14 wherein the second liquid medium is water from the water inlet.

16. The improved water filter apparatus as claimed in claim 15 wherein the second liquid medium provides anions in the hydroxyl form to maintain the solubility or concentration of the solid chemical phosphate or polyphosphate complexing agent.

17. The improved water filter apparatus as claimed in claim 14 wherein the first liquid medium is from the cation exchanger.

18. The improved water filter apparatus as claimed in claim 14 wherein the solid chemical phosphate or polyphosphate complexing agent to reduce mineral precipitates is a phosphate.

19. The improved water filter apparatus as claimed in claim 14 further comprising a connection head to connect the water filter to a water feed line and a water discharge line.

20. The improved water filter apparatus as claimed in claim 14 further comprising a mixing space disposed in the top of the second compartment or receptacle to strongly mix the first medium with the solid chemical phosphate or polyphosphate complexing agent to reduce mineral precipitates.

21. The improved water filter apparatus of claim 14 wherein the constantly open bypass conduit is a blending conduit connecting the water inlet to the second compartment.

22. An improved water filter apparatus having a water inlet and a water outlet comprising:

(a) a solid water soluble phosphate or polyphosphate complexing agent to reduce mineral precipitates in water disposed between the inlet and outlet;

(b) a first compartment to have a first medium selected from the group consisting of an acidic aqueous liquid or water treated by a cation exchanger to change a solubility rate or concentration of the solid water soluble phosphate or polyphosphate complexing agent with a short contact time;

(c) a second compartment connected to the first compartment, said second compartment housing the solid water soluable phosphate or polyphosphate complexing agent;

(d) a constantly open bypass conduit connected to the water inlet and the second compartment to provide access to a second medium to change the solubility rate of the phosphate or polyphosphate complexing agent with a longer contact time than the short contact time with the first medium wherein the second medium is selected from a group consisting of a liquid less acidic than the first liquid or water to change the concentration of the solid water soluble phosphate or polyphosphate complexing agent in the second compartment; and (e) at least one water permeable area to separate the first medium from the second medium and enable the first medium to strongly contact the solid water soluble phosphate or polyphosphate complexing agent and subsequently enable the second medium to keep the concentration of the water soluble solid phosphate or polyphosphate complexing agent in a prescribed range.

23. The improved water filter apparatus of claim 22 further comprising a filter wherein the constantly open bypass conduit connects the water inlet with the second compartment.

24. The water filter apparatus of claim 22 wherein the solid water soluable phosphate or polyphosphate complexing agent is a polyphosphate.

25. The water filter article of claim 22 wherein the at least one water permeable area is a water permeable barrier that separates the second medium from the solid water soluble phosphate or polyphosphate complexing agent to reduce mineral precipitates.

* * * * *